United States Patent
Huang et al.

(10) Patent No.: US 9,836,592 B2
(45) Date of Patent: Dec. 5, 2017

(54) FINGERPRINT SCANS WITH POWER BUTTONS

(71) Applicant: HEWLETT-PACKARD DEVELOPMENT COMPANY, L.P., Houston, TX (US)

(72) Inventors: Yi-Hsuan Huang, Taipei (TW); Chin-Lung Chiang, Taipei (TW); Tao-Sheng Chu, Taipei (TW); An Chih Chu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

(21) Appl. No.: 14/946,329

(22) Filed: Nov. 19, 2015

(65) Prior Publication Data
US 2017/0147800 A1    May 25, 2017

(51) Int. Cl.
*G06F 21/00* (2013.01)
*G06F 21/32* (2013.01)
*G06K 9/00* (2006.01)
*G06F 21/62* (2013.01)

(52) U.S. Cl.
CPC .......... *G06F 21/32* (2013.01); *G06F 21/6218* (2013.01); *G06K 9/00013* (2013.01); *G06K 9/00087* (2013.01)

(58) Field of Classification Search
CPC . G06F 21/32; G06F 21/6218; G06K 9/00087; G06K 9/00013
See application file for complete search history.

(56) References Cited

U.S. PATENT DOCUMENTS

| | | | |
|---|---|---|---|
| 6,078,265 A | 6/2000 | Bonder et al. | |
| 9,261,991 B2 * | 2/2016 | Alameh | G06F 21/32 |
| 2006/0226951 A1 * | 10/2006 | Aull | G06F 21/32 340/5.61 |
| 2006/0282679 A1 * | 12/2006 | Nicholson | G06F 21/32 713/186 |
| 2007/0058843 A1 | 3/2007 | Theis et al. | |
| 2007/0090918 A1 | 4/2007 | Engstrom et al. | |
| 2011/0205016 A1 * | 8/2011 | Al-Azem | H04L 63/0861 340/5.52 |
| 2012/0005747 A1 * | 1/2012 | Tribble | G06F 21/34 726/18 |

(Continued)

OTHER PUBLICATIONS

Daniel P—"Sony to go metal with the Xperia Z4, embed touch fingerprint sensor in the power key" —phonearena,com — Apr. 2015 — 9 pgs.

*Primary Examiner* — Mahfuzur Rahman
(74) *Attorney, Agent, or Firm* — HP Inc. Patent Department

(57) ABSTRACT

Example implementations relate to fingerprint scans with power buttons. For example, a computing device may include a power button and a processor. The power button receives a user input associated with an activation of the power button to turn on the computing device and scans a fingerprint associated with the user input while the computing device is initialized in response to the activation. The processor determines whether the fingerprint matches an authorized fingerprint from a database of stored fingerprints, identifies an account associated with the fingerprint when the fingerprint matches the authorized fingerprint, and provides a desktop environment associated with the account.

18 Claims, 3 Drawing Sheets

(56) References Cited

U.S. PATENT DOCUMENTS

| | | | |
|---|---|---|---|
| 2012/0019356 A1* | 1/2012 | Gagneraud | G06F 21/32 340/5.32 |
| 2013/0314208 A1* | 11/2013 | Risheq | G07C 9/00158 340/5.53 |
| 2014/0359484 A1* | 12/2014 | Morecki | G06F 3/0481 715/753 |
| 2014/0359756 A1* | 12/2014 | Alameh | G06F 21/32 726/19 |
| 2015/0086090 A1 | 3/2015 | Jung et al. | |
| 2016/0254942 A1* | 9/2016 | de Luna | G06F 9/44584 709/212 |
| 2016/0314291 A1* | 10/2016 | de Luna | G06F 21/32 |
| 2017/0006223 A1* | 1/2017 | Hargreaves | G06K 9/00067 |
| 2017/0109011 A1* | 4/2017 | Jiang | G06F 3/04817 |

* cited by examiner

FINGERPRINT SCANS WITH POWER BUTTONS

BACKGROUND

A computing device may be associated with a plurality of users, where each user may log in to their respective account by providing their user credentials at a login screen. For example, when a user turns on a computing device, the computing device may present a login screen, and the user may provide a username and/or a password in order to access the computing device.

BRIEF DESCRIPTION OF THE DRAWINGS

Some examples of the present application are described with respect to the following figures.

DETAILED DESCRIPTION

Figure 1:
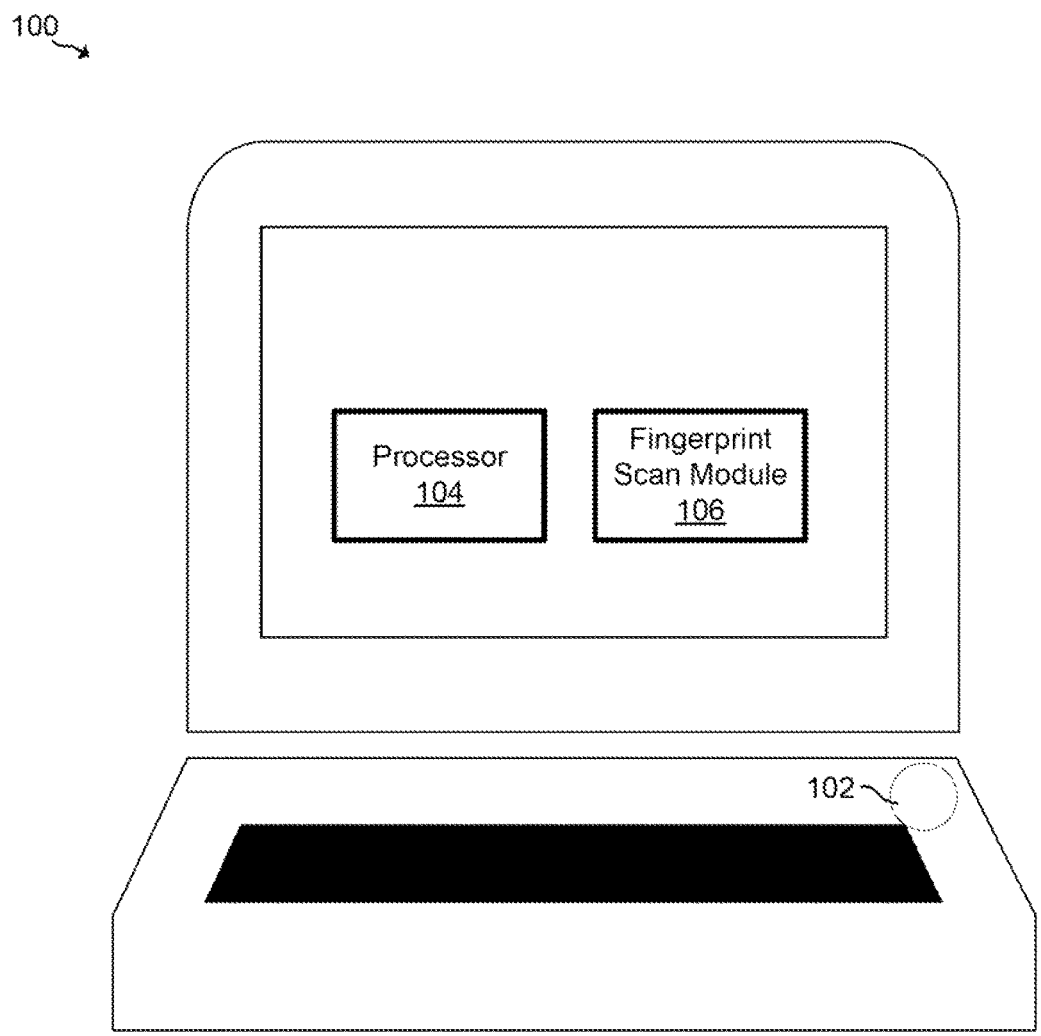
FIG. 1 illustrates an example computing device for performing a fingerprint scan with a power button of the computing device.

As described above, a computing device may be associated with a plurality of users, where each user may log in to their respective account by providing their user credentials at a login screen. In some cases, a user may provide their user credentials in the form of a fingerprint at a fingerprint reader in order to access their respective account. For example, when a user turns on a computing device, the computing device may begin to boot, which includes initializing the computing device's Basic Input/Output System (BIOS) and the central processing unit (CPU) of the computing device. Once the BIOS and CPU are initialized, the BIOS may load the operating system of the computing device, and the operating system may provide a login screen for a user to log into the computing device using the user's credentials, such as a username, password, and/or fingerprint of the user. The user typically must wait for the operating system to load and for the login screen to be provided before the user may provide the user credentials (e.g., username, password, fingerprint, etc.).

Examples discussed herein may allow a user to provide their user credentials in the form of a fingerprint when the user powers on the computing device using a power button of the computing device, without having to wait for the operating system to load and for the login screen to be provided, which allows the computing device to automatically log on to the user's account more quickly. The user's fingerprint may be scanned using the power button of the computing device, where the power button may be any suitable device to turn the computing device on in any suitable manner (e.g., pressing the power button, touching the power button, switching the power button on, etc.) and from any suitable state (e.g., turn the computing device from an off mode and/or a sleep mode to a powered-on mode). The power button may include any suitable fingerprint scanner for scanning a user's fingerprint.

For example, when a user activates the power button of a computing device to turn on the computing device, the computing device may detect that the power button has been activated and may begin the process of initializing the computing device. Initializing the computing device may include initializing the computing device's BIOS and CPU. Additionally, when the power button is activated, the embedded controller of the computing device may scan the user's fingerprint. While the computing device is being initialized, a database of stored fingerprints may be accessed and loaded by the BIOS from non-volatile random access memory (NVRAM). The database of stored fingerprints may include fingerprints that have been stored on the computing device by the fingerprint controller associated with the fingerprint scanner (e.g., after a user registers an account using a fingerprint), where the fingerprints stored in the database may each be associated with a user of the computing device. The BIOS and embedded controller may compare the fingerprint scanned upon activation of the power button with the fingerprints in the database of stored fingerprints to determine whether there is a fingerprint in the database that matches. If there is a fingerprint match, the BIOS may pass information associated with the matching fingerprint (e.g., an identifier associated with the matching fingerprint) to the operating system after the operating system has successfully loaded. The operating system may use the information associated with the fingerprint match to identify an account associated with the fingerprint match. The accounts associated with fingerprints stored in the database may be authorized accounts, which may be accounts that are authorized to be accessed on the computing device, and/or unauthorized accounts, which may be accounts that are not authorized to be accessed on the computing device. If the account identified is an authorized account, the computing device may automatically log in to the account associated with the fingerprint match and provide the desktop environment associated with the account to the user. A desktop environment may be any suitable arrangement of applications, settings, and/or configurations provided after logging into an account. If the account identified is an unauthorized account, the computing device may automatically shut down the computing device (e.g., as a security measure).

In some examples, when a matching fingerprint is found by the BIOS in the database, a fingerprint identifier (e.g., fingerprint identifier idFPR) managed by the embedded controller of the computing device may be set to '1,' indicating that a matching fingerprint has been found in the database of stored fingerprints. When a matching fingerprint is not found by the BIOS in the database, a fingerprint identifier (e.g., fingerprint identifier idFPR) managed by the embedded controller of the computing device may be set to '0,' indicating that a fingerprint match has not been found in the database of stored fingerprints. In some examples, the fingerprint identifier may be included in the information associated with the fingerprint match that is passed to the operating system. In some examples, the fingerprint identifier may be read directly by the operating system from the embedded controller and/or BIOS.

Additionally, the BIOS and embedded controller may set a flag (e.g., iniFPR) based on whether the computing device is to request login information from a user or whether the computing device is to shut down. For example, when the matching fingerprint is associated with an unauthorized account, the iniFPR flag may be set to '1,' which may indicate that the computing device is to automatically shut down due to an unauthorized user being detected. When a fingerprint match cannot be determined for any suitable reason (e.g., bad fingerprint scan, no fingerprint match found in the database of stored fingerprints, etc.), the iniFPR flag may be set to '0,' which may indicate that the login information is to be requested from the user. For example, if a user's fingerprint did not scan properly, the user may provide their credentials in another manner (e.g., another fingerprint scan, username, and/or password) in order to log into their account, or if a user does not have an existing account, the user may register for an account on the computing device such that a new account may be created for the user using the registration information. In some examples, the flag may be included in the information associated with the fingerprint match that is passed to the operating system. In some examples, the flag may be read directly by the operating system from the embedded controller and/or BIOS.

In some examples, the power button may receive a user input to wake up the computing device from a sleep mode and may scan another fingerprint associated with this user input. If the fingerprint is identified with a different account than the one previously accessed, the desktop environment associated with that different account may be provided.

Referring now to the figures, FIG. 1 is a block diagram of an example computing device 100 for performing a fingerprint scan with a power button 102 of the computing device 100. The computing device 100 includes the power button 102, which may be any suitable device to turn the computing device 100 on in any suitable manner (e.g., pressing the power button 102, touching the power button 102, switching the power button 102 on, etc.) and from any suitable state (e.g., turn the computing device 100 from an off mode and/or a sleep mode to a powered-on mode). The power button 102 may include any suitable fingerprint scanner for scanning a user's fingerprint. For example, the power button 102 may receive a user input associated with an activation of the power button 102 to turn on the computing device 100 and may scan a fingerprint associated with the user input while the computing device 100 is initialized in response to the activation.

The computing device 100 also includes a processor 104, which is a tangible hardware component that may be any suitable type of processor (e.g., a central processing unit (CPU), a semiconductor-based microprocessor, etc.). The processor 104 may be in communication with a fingerprint scan module 106 of the computing device 100, which may be any suitable hardware (e.g., firmware) and/or software (e.g., software stored in a machine-readable storage medium) module to determine whether the fingerprint scanned by the power button 102 matches an authorized fingerprint from a database of stored fingerprints, identify an account associated with the fingerprint when the fingerprint matches the authorized fingerprint, and provide a desktop environment associated with the account, as will be described in further detail below.

Figure 2:
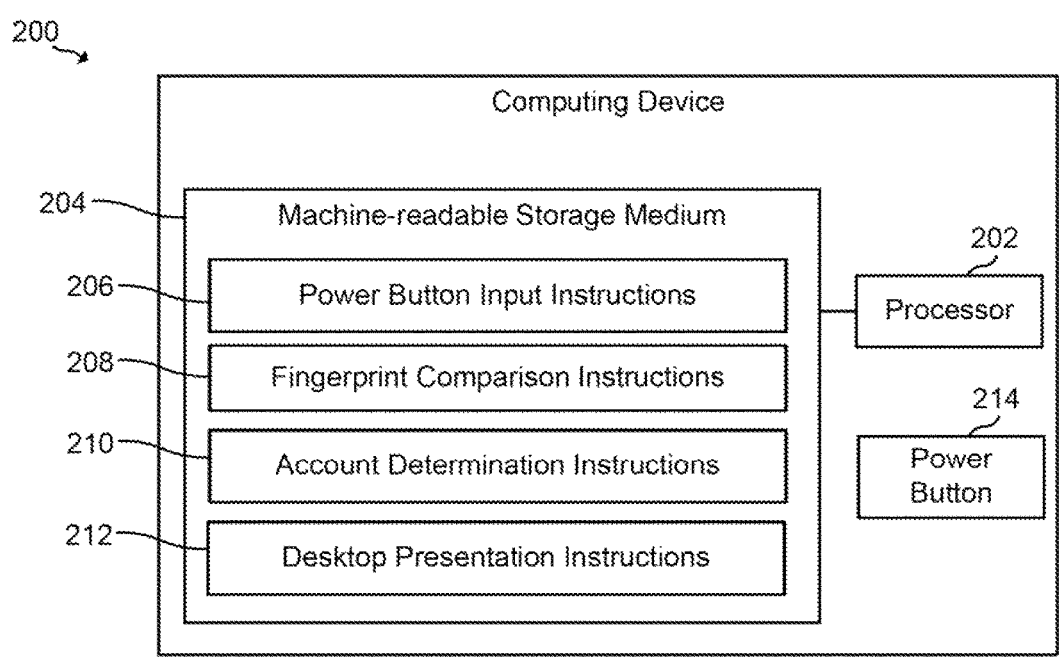
FIG. 2 is a block diagram of another example computing device for performing a fingerprint scan with a power button of the computing device.

FIG. 2 is a block diagram of another example computing device 200 for performing a fingerprint scan with a power button 214 of the computing device 200. Computing device 200 may be any suitable computing device managing user accounts associated with at least one user, where a user account may be accessed by a fingerprint being scanned through the power button 214 (e.g., scanned when the user turns on the computing device 200 using the power button 214).

Computing device 200 may be, for example, a web-based server, a local area network server, a cloud-based server, a notebook computer, a desktop computer, an all-in-one system, a tablet computing device, a mobile phone, an electronic book reader, a printing device, or any other electronic device suitable for performing a fingerprint scan with a power button 214 of the computing device 200. Computing device 200 may include a processor 202 and a machine-readable storage medium 204. Computing device 200 may allow access to a user's account on the computing device 200 by scanning the user's fingerprint through the power button 214 when the user powers on the computing device 200 using the power button 214.

Processor 202 is a tangible hardware component that may be a CPU, a semiconductor-based microprocessor, and/or other hardware devices suitable for retrieval and execution of instructions stored in machine-readable storage medium 204. Processor 202 may fetch, decode, and execute instructions 206, 208, 210, and 212 to control a process of performing a fingerprint scan with a power button 214 of the computing device 200. As an alternative or in addition to retrieving and executing instructions, processor 202 may include at least one electronic circuit that includes electronic components for performing the functionality of instructions 206, 208, 210, 212, or a combination thereof.

Machine-readable storage medium 204 may be any electronic, magnetic, optical, or other physical storage device that contains or stores executable instructions, Thus, machine-readable storage medium 204 may be, for example, Random Access Memory (RAM), an EPROM, an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, 210, and 212 for receiving, via the power button 214, a user input associated with an activation of the power button 214, the activation of the power button 214 to turn on the computing device 200; capturing, via the power button 214, a fingerprint associated with the user input while the computing device is initialized in response to the activation; identifying whether the fingerprint matches an authorized fingerprint from a database of stored fingerprints; determining an account associated with the fingerprint when the fingerprint matches the authorized fingerprint; and presenting a desktop environment associated with the account.

Power button input instructions 206 may manage and control the receipt of a user input associated with an activation of the power button 214, which may be any suitable device capable of being activated in order to turn on the computing device 200. The power button input instructions 206 may also capture a fingerprint associated with the user input while the computing device 200 is initialized in response to the activation, where the fingerprint capture may be performed via the power button 214.

Fingerprint comparison instructions 208 may manage and control the identification of whether the fingerprint scanned via the power button 214 matches an authorized fingerprint from a database of stored fingerprints. For example, the fingerprint comparison instructions 208 may compare the scanned fingerprint with other fingerprints in the database to identify a matching fingerprint.

Account determination instructions 210 may manage and control the determination of an account associated with the fingerprint when the fingerprint matches the authorized fingerprint from the database of fingerprints. For example, when a fingerprint match is identified, the account associated with that fingerprint may be determined and accessed.

Desktop presentation instructions 212 may manage and control the presentation of a desktop environment associated with the identified account. This may include presenting the desktop environment based on applications, settings, and/or configurations associated with the account.

Figure 3:
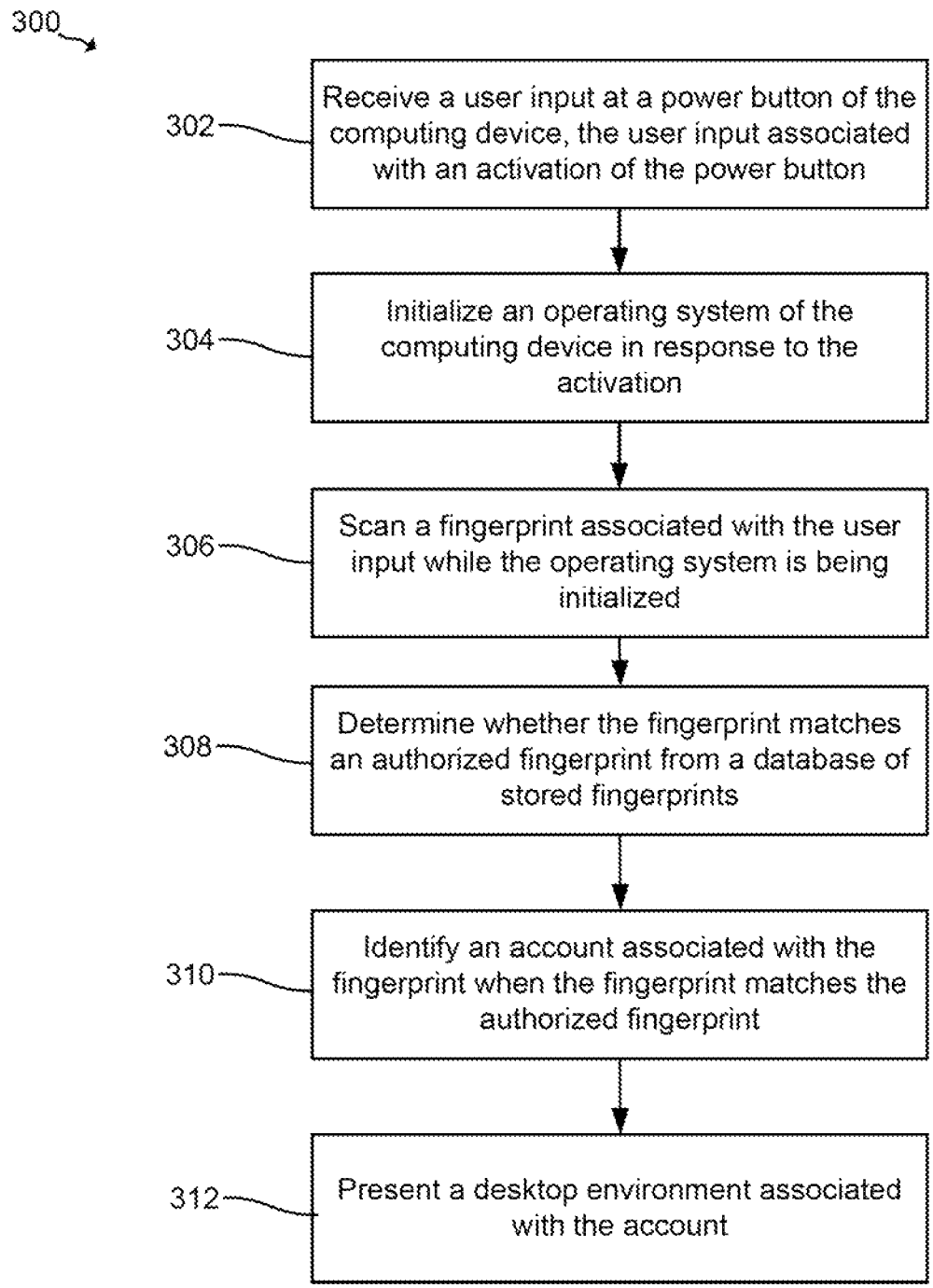
FIG. 3 is a flowchart of an example method for performing a fingerprint scan with a power button of a computing device.

FIG. 3 is a flowchart of an example method 300 for performing a fingerprint scan with a power button of a computing device. Method 300 may be implemented using computing device 200 of FIG. 2.

Method 300 includes, at 302, receiving a user input at a power button of the computing device, the user input associated with an activation of the power button. The activation of the power button may turn on the computing device. For example, the power button input instructions 206 of FIG. 2 may receive a user input at the power button 214 in order to turn on the computing device 200.

Method 300 also includes, at 304, initializing an operating system of the computing device in response to the activation. For example, the power button input instructions 206 of FIG. 2 may, in response to the activation of the power button 214, initialize an operating system of the computing device 200 such that the applications of the computing device may be usable.

Method 300 also includes, at 306, scanning a fingerprint associated with the user input while the operating system is being initialized. For example, the power button input instructions 206 of FIG. 2 may scan a user's fingerprint upon activation of the power button 214 and while the operating system is being initialized.

Method 300 also includes, at 308, determining whether the fingerprint matches an authorized fingerprint from a database of stored fingerprints. For example, fingerprint comparison instructions 208 of FIG. 2 may access a database of stored fingerprints and determine whether the scanned fingerprint matches an authorized fingerprint in the database.

Method 300 also includes, at 310, identifying an account associated with the fingerprint when the fingerprint matches the authorized fingerprint. For example, the account identification instructions 210 of FIG. 2 may identify an account associated with the fingerprint when the fingerprint matches the authorized fingerprint determined by the fingerprint comparison instructions 208 of FIG. 2.

Method 300 also includes, at 312, presenting a desktop environment associated with the account. For example, the desktop instructions 213 of FIG. 2 may present a desktop environment that is specific to the account identified by the account identification instruction 210 of FIG. 2.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device, comprising:
a power button to:
    receive a user input associated with an activation of the power button, the activation of the power button to turn on the computing device;
    scan, using the power button, a fingerprint associated with the user input while the computing device is initializing in response to the activation; and
    receive another user input to wake up the computing device from a sleep mode and scan another fingerprint associated with the another user input; and
a hardware processor to:
    determine whether the fingerprint matches an authorized fingerprint from a database of stored fingerprints;
    identify an account associated with the fingerprint in response to the fingerprint matching the authorized fingerprint;
    present a desktop environment associated with the account, the presented desktop environment including an arrangement of applications; and
    identify a different account associated with the another fingerprint and provide a different desktop environment associated with the different account.

2. The computing device of claim 1, further comprising:
an embedded controller to compare the fingerprint with the stored fingerprints prior to loading of an operating system of the computing device.

3. The computing device of claim 1, wherein the hardware processor is further to:
determine whether the fingerprint matches an unauthorized fingerprint from the database of stored fingerprints; and
automatically turn off the computing device in response to the fingerprint matching the unauthorized fingerprint.

4. The computing device of claim 1, wherein the hardware processor is further to:
determine whether the fingerprint matches a further fingerprint from the database of stored fingerprints; and
request login information in response to the fingerprint not matching the further fingerprint in the database of stored fingerprints.

5. The computing device of claim 1, wherein the hardware processor is further to:
determine whether the fingerprint matches a further fingerprint from the database of stored fingerprints;
request registration information from a user in response to the fingerprint not matching the further fingerprint in the database of stored fingerprints; and
create a new account for the user based on the registration information.

6. The computing device of claim 1, further comprising a Basic Input/Output System (BIOS) code to compare the fingerprint scanned by the power button to the stored fingerprints prior to loading of an operating system by the BIOS code, the BIOS code to pass an identifier of the authorized fingerprint identified by the comparing to the operating system after the loading of the operating system.

7. A method, comprising:
receiving, by a computing device, a user input at a power button of the computing device, the user input associated with an activation of the power button to turn on the computing device;
initializing, by the computing device, an operating system of the computing device in response to the activation;

scanning, by the computing device via the power button, a fingerprint associated with the user input while the operating system is being initialized;

determining, by the computing device, whether the fingerprint matches an authorized fingerprint from a database of stored fingerprints;

identifying, by the computing device, an account associated with the fingerprint in response to the fingerprint matching the authorized fingerprint;

presenting, by the computing device, a desktop environment associated with the account;

receiving, by the computing device via the power button, another user input to wake up the computing device from a sleep mode;

scanning, by the computing device via the power button, another fingerprint associated with another the user input;

identifying, by the computing device, a different account associated with the another fingerprint; and providing, by the computing device, a different desktop environment associated with the different account.

8. The method of claim 7, further comprising:

comparing, by an embedded controller of the computing device, the fingerprint with the stored fingerprints.

9. The method of claim 7, further comprising:

determining, by the computing device, whether the fingerprint matches an unauthorized fingerprint from the database of stored fingerprints; and automatically turning off the computing device in response to the fingerprint matching the unauthorized fingerprint.

10. The method of claim 7, further comprising:

determining, by the computing device, whether the fingerprint matches a further fingerprint from the database of stored fingerprints; and requesting, by the computing device, login information in response to the fingerprint not matching the further fingerprint in the database of stored fingerprints.

11. The method of claim 7, further comprising:

determining, by the computing device, whether the fingerprint matches a further fingerprint from the database of stored fingerprints;

requesting, by the computing device, registration information from the user in response to the fingerprint not matching the further fingerprint in the database of stored fingerprints; and creating, by the computing device, a new account for the user based on the registration information.

12. The method of claim 7, further comprising comparing, by a Basic Input/Output System (BIOS) code, the fingerprint scanned by the power button to the stored fingerprints prior to loading of the operating system of the computing device.

13. The method of claim 12, further comprising:

passing, by the BIOS code, an identifier of the authorized fingerprint identified by the comparing to the operating system after the loading of the operating system.

14. A non-transitory machine-readable storage medium storing instructions that, when executed by a processor of a computing device, cause the computing device to:

receive, via a power button, a user input associated with an activation of the power button of the computing device, the activation of the power button to turn on the computing device;

capture, by a fingerprint scanner the power button, a fingerprint associated with the user input while the computing device is initializing in response to the activation and prior to loading of an operating system of the computing device;

identify whether the fingerprint matches an authorized fingerprint from a database of stored fingerprints;

determine an account associated with the fingerprint in response to the fingerprint matching the authorized fingerprint;

present a desktop environment associated with the account;

receive, via the power button, another user input to wake up the computing device from a sleep mode;

scan, via the power button, another fingerprint associated with the another user input;

identify a different account associated with the another fingerprint; and provide a different desktop environment associated with the different account.

15. The non-transitory machine-readable storage medium of claim 14, wherein the instructions further cause the computing device to:

determine whether the fingerprint matches an unauthorized fingerprint from the database of stored fingerprints; and automatically turn off the computing device in response to the fingerprint matching the unauthorized fingerprint.

16. The non-transitory machine-readable storage medium of claim 14, wherein the instructions further cause the computing device to:

determine whether the fingerprint matches a further fingerprint from the database of stored fingerprints; and request login information in response to the fingerprint not matching the further fingerprint in the database of stored fingerprints.

17. The non-transitory machine-readable storage medium of claim 14, wherein the instructions further cause the computing device to:

compare, by a Basic Input/Output System (BIOS) code, the fingerprint scanned by the power button to the stored fingerprints prior to loading of the operating system by the BIOS code, the BIOS code to pass and identifier of the authorized fingerprint identified by the comparing to the operating system after the loading of the operating system.

18. The non-transitory machine-readable storage medium of claim 14, wherein the activation of the power button causes the computing device to wake up from a sleep mode.

* * * * *

UNITED STATES PATENT AND TRADEMARK OFFICE
CERTIFICATE OF CORRECTION

PATENT NO. : 9,836,592 B2  
APPLICATION NO. : 14/946329  
DATED : December 5, 2017  
INVENTOR(S) : Yi-Hsuan Huang et al.

Page 1 of 1

It is certified that error appears in the above-identified patent and that said Letters Patent is hereby corrected as shown below:

In Column 8, Line 8, in Claim 14, delete "the" and insert -- of the --, therefor.

In Column 8, Line 49 approx., in Claim 17, delete "and" and insert -- an --, therefor.

Signed and Sealed this  
Fourteenth Day of August, 2018

Andrei Iancu  
*Director of the United States Patent and Trademark Office*